United States Patent
Xie

(10) Patent No.: US 12,202,288 B2
(45) Date of Patent: Jan. 21, 2025

(54) ENGINEERED STONE SLAB, AND APPARATUS AND METHOD FOR CREATING

(71) Applicant: Alex Xie, West Windsor, NJ (US)

(72) Inventor: Alex Xie, West Windsor, NJ (US)

( * ) Notice: Subject to any disclaimer, the term of this patent is extended or adjusted under 35 U.S.C. 154(b) by 0 days.

(21) Appl. No.: 18/200,384

(22) Filed: May 22, 2023

(65) Prior Publication Data

US 2024/0391265 A1    Nov. 28, 2024

(51) Int. Cl.
  *B41M 5/00* (2006.01)
  *B44C 1/17* (2006.01)
  *G06T 7/00* (2017.01)
  *B44F 9/04* (2006.01)

(52) U.S. Cl.
  CPC ........... *B41M 5/007* (2013.01); *B44C 1/1704* (2013.01); *G06T 7/001* (2013.01); *B44F 9/04* (2013.01); *G06T 2207/30132* (2013.01)

(58) Field of Classification Search
  CPC ...... B41M 5/007; B44C 1/1704; G06T 7/001; G06T 2207/30132; B44F 9/04
  See application file for complete search history.

(56) References Cited

U.S. PATENT DOCUMENTS

| | | | |
|---|---|---|---|
| 5,098,772 A * | 3/1992 | af Strom | B44C 1/1756 428/914 |
| 9,511,516 B2 | 12/2016 | Xie | |
| 9,707,698 B1 | 7/2017 | Xie | |
| 10,376,912 B2 | 8/2019 | Xie | |
| 10,843,977 B2 | 11/2020 | Xie | |
| 2018/0194164 A1 | 7/2018 | Benito Lopez et al. | |
| 2021/0229313 A1 | 7/2021 | Rodriguez Garcia et al. | |
| 2023/0294325 A1 * | 9/2023 | Pistoni | H04N 1/6047 101/35 |

FOREIGN PATENT DOCUMENTS

| | | | |
|---|---|---|---|
| CN | 1669755 A | | 3/2004 |
| CN | 108202431 A | * | 6/2018 |
| DE | 202019101133 U1 | * | 4/2020 |
| ES | 2713776 B2 | | 5/2019 |
| WO | WO2022/172242 A1 | | 8/2022 |

OTHER PUBLICATIONS

English machine translation of CN-108202431.*
English machine translation of DE-202019101133.*

* cited by examiner

*Primary Examiner* — Robert S Walters, Jr.
(74) *Attorney, Agent, or Firm* — Walter J. Tencza, Jr.

(57) ABSTRACT

Obtaining a reference image of a natural stone; producing a first engineered stone slab which approximates an aspect of the reference image of the natural stone; performing an examination of the first engineered stone slab; using the reference image and results of the examination, to create a first masking image; and printing the first masking image onto the first engineered stone slab. Producing a second engineered stone slab which approximates the aspect of the reference image of the natural stone, wherein the first and the second engineered stone slabs provide different approximations, as caused by random variation in a manufacturing process; performing an examination of the second engineered stone slab to obtain results; using the reference image and results of the examination of the second engineered stone slab, to create a second masking image; and printing the second masking image onto the second engineered stone slab.

23 Claims, 12 Drawing Sheets

ENGINEERED STONE SLAB, AND APPARATUS AND METHOD FOR CREATING

FIELD OF THE INVENTION

This invention relates to engineered stone slabs and apparatuses and methods for creating them.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications.

The production of engineered stone generally involves particulate materials such as ground quartz rock, crushed glass, rocks, pebbles, sand, shells, silicon, and other inorganic materials combined with polymers, binders, resins, colorants, dyes, etc. The particulate material(s) may be varying sizes ranging from four hundred mesh particle size to four mesh particle size with multiple materials of different sizes used simultaneously. The polymer(s) may include agents such as a binder, hardener, initiator, or combination of such. The particulate material(s) and polymers, binders, resins, colorants, dyes, etc. are then mixed resulting in a slightly damp mixture. This initial mixture may be processed through a crushing machine to reduce the size of the combined particles. The resultant, finer mixture may be poured into a supporting mold, tray, or other supporting structure. The mold or tray containing the damp mixture is then moved onto a conveyor belt with a backing sheet, then a processed damp "slab" is moved into a vacuum press machine to compress the material. The compressed material is then placed into a curing machine to be heated into a hardened quartz slab. After curing, the hardened slab is generally moved to a grinder to be grinded down to a desired thickness, followed by a polisher to finish the product.

Quartz based stone has many advantages over natural stone such as marble and granite. Compared to these natural stones, quartz is harder, stronger, less water absorbent, and more resistant to staining, scratching, breakage, chemicals, and heat. One of the drawbacks of quartz is its perceived lack of natural, random looking veins and color patterns compared with natural stones.

Many known methods have been used to manufacture engineered stone to mimic the visual appearance of certain types of natural stones-such as marble, onyx, travertine, calacatta marble, etc. However, it is very difficult to manufacture engineered stone with a visual appearance like that of natural stones due to limitations of known engineered stone manufacturing processes.

For example, it is very common in a natural stone slab that the color or shade gradually transitions from one color or shade to another color or shade. However, in engineered stone, due to the limitations of known manufacturing processes, there is typically not a gradual color or shade transition. At least for one known manufacturing process, this is because the manufacturing process involves mixing different colors in corresponding mixers to produce a homogenized color which is then blended with another color, such as taught by U.S. Pat. Nos. 10,843,977; 9,707,698; and 9,511,516 (all incorporated herein by reference) to the inventor Alex Xie.

Another known manufacturing process involves using molds to produce veining that has a clear boundary of color or shade, such as shown in U.S. Pat. No. 10,376,912 (incorporated herein by reference) to inventor Alex Xie, and as shown in other references such as US published application 2018/0194164A1 (incorporated by reference herein), ES2713776B2, and CN1669755A. These methods result in a product that does not look close enough to natural stone because there is no gradual color or shade transition.

Therefore, the aesthetic details of an engineered stone slab are not as realistic as an image or picture of a natural stone slab.

For any stone slab to be used as countertop, the veining and color is ideally "through body". This means the veining and color is not simply visible on the surface of the slab but through the entire thickness of the slab. This is because countertops have finished edges that can be seen. It may not exactly represent the surface pattern, but it should resemble to a certain degree the color and pattern of the surface veining.

There are existing methods to make the surface of the engineered stone slab look exactly like that of a natural stone slab, such as shown in shown in WO2022/172242 A1 (incorporated by reference herein). These methods are digital printing, silk screening, or other similar methods such as a decal to transfer the image of a natural stone slab onto the surface of the engineered stone slab. The disadvantage of these methods is that the color and veining is only on the surface of the slab. When a stone fabricator cuts the unfinished slab for use in a finished countertop, the newly created edges will expose a completely different color or pattern compared to the printed surface of the engineered stone slab. Some methods combine the traditional methods with digital printing in order to produce a through bodied slab with detailed printed features on the surface, however these prior known methods do not examine or scan a top surface of an original engineered stone slab (produced by a traditional method) and use the examination or scanning to determine what to print onto the top surface of the original engineered stone slab to form a modified engineered stone slab.

SUMMARY OF THE INVENTION

The present invention, in one or more embodiments, is an improvement beyond known conventional digital printing methods for creating an engineered stone slab.

In one or more embodiments of the present invention the following steps are performed:

(a) An image or images of a desired natural stone slab surface is selected that may be modified, for example, in a computer memory for a number of reasons including design changes, feasibility in regards to aligning with known engineered stone production processes, or in order to proportionally fit within the dimensions that a final engineered stone slab will be produced to. After modification this image may be referred to as the reference image, which may be stored in a computer memory.

(b) A slab is produced using known methods such as for example, but not limited to, as described in patents such as U.S. Pat. Nos. 10,843,977; 9,707,698; 9,511,516; US20180194164A1 (all incorporated by reference herein); ES2713776B2; CN1669755A, and many others. The slab may be produced to generally align with the reference image of the desired natural stone, however, due to limitations in currently known processes of manufacturing engineered stone, the color and movement of any given engineered stone slab may vary when compared to the reference image. In addition, the potential for visual defects such as contaminants, color spots or pollution, and vein deformation are inherent in the manufacturing process.

(c) Examine, scan or photograph the engineered stone slab and compare this to the reference image. Adjust the reference image, such as in computer memory, in order to create a masking image, such as in computer memory, so that the masking image is better aligned in terms of color and movement with the engineered stone slab compared to the reference image, and/or any visual defects are eliminated or hidden.

(d) Print the masking image on top of the engineered stone slab. The image to be printed may vary in size. In some cases the image may cover the entire top surface of the engineered stone slab, and in others may be a small portion of the slab. The image may also be printed onto a decal or other intermediary prior to application onto the engineered stone slab.

Using traditional methods of manufacturing engineered stone made to mimic natural stone, there are always variations in the color and movement between any two slabs produced. In this process, a particular slab may be produced to be as close to a desired image of natural stone as possible, understanding that it will never be a perfect match. Due to this, if the same image of natural stone were to be printed on any given number of slabs produced (for example, a daily production run of five hundred slabs), the image would align differently for all five hundred slabs since all five hundred are unique and not carbon copies.

As an example, let's say we want the original engineered slab to have a circle, whose center is at a particular x and y location on the two dimensional top surface of the slab. When we use conventional methods to form two original engineered stone slabs, the first original engineered stone slab may have the circle, centered at x, y, while the second original engineered stone slab may have the circle centered at x', y', where x' is different from x, and y' is different from y. If we want to print a star centered within both the first and second original engineered stone slabs the star needs to be printed centered at x, y, for the first original engineered stone slab, and the star needs to be printed centered at x', y', for the second original engineered stone slab, even though the width, length, and thickness dimensions of the two original engineered stone slabs may be identical or substantially identical.

In order to ensure that the image (such as the star in the previous example) printed onto any given slab perfectly aligns with an image on the two dimensional top surface that we are trying to align it with (such as the circle in the previous example) the image (in computer memory) must be adjusted (such as by shifting in computer memory), (and then printed on the slab) to match the specific slab in question. For example, the reference image (which may be scanned in and stored in computer memory) may have a specific vein that is 1.1 inches wide and located at position x. In at least one embodiment of the present invention a slab is manufactured using traditional methods and has a uniquely wide vein having a width of 1.2 inches, and the vein is located 1.7 inches to the right of position x. The reference image of natural stone (scanned in and stored in computer memory) must be modified (typically as in computer memory) into a masking image prior to printing, in which the masking image has a modified vein in question to be 1.2 inches wide and moved 1.7 inches to the right relative to the placement of the vein on the original image of natural stone. This masking image is then exclusively printed onto a particular slab, since the masking image was created specifically to be printed on only this one slab. The next slab in the production process is then examined and found to have a uniquely narrow vein in question, having a width of 0.8 inches, and located 1.3 inches to the left of position x. The reference image of natural stone, stored in computer memory, must be modified into a masking image in computer memory, prior to printing, in which masking image, has a modified vein in question to be 0.8 inches wide, and moved 1.3 inches to the left relative to the placement of the vein on the reference image of natural stone. This masking image is then exclusively printed onto this second slab and then discarded. In this manner, each of the five hundred slabs produced that day may have a different masking image generated in computer memory to be printed onto each specific slab. Vein placement is not the only modification that may be made. The color of each vein on the desired image of natural stone may also be adjusted during the creation of the particular masking image to better match the color of the specific slab it will be printed on. This modification is not limited to only one vein. Every vein identified on the original image of natural stone may be modified in placement and color prior to printing.

In addition, during production there may be aesthetic defects present that are unique to any given slab. The examination of the slab, by a human being or by a computer using a variety of methods including artificial intelligence (AI), may identify these defects and edit the masking image, in computer memory, to either cover up the defect by printing a color that matches the base tone of the slab over the defect, as shown in FIGS. 5 and 6. Alternatively, it may be determined that the defect is close enough to a vein or other feature, and modify the vein or feature to stretch out over the defect as shown in FIG. 7 (original image of natural stone), 8 (original engineered stone slab with a visual defect) and 9 (engineered stone slab after a unique masking image has been generated and printed onto the slab, extending the nearby vein in order to print over and therefore cover the defect). This type of modification is inherently unique to the slab being processed, since every aesthetic defect is generally unique. Therefore, a unique masking image must be created from the original image of natural stone, stored in computer memory, to be printed on the slab in question. It may also be possible that two different engineered stone slabs have a very similar visual defect and the two masking images generated based on the examination of each slab are substantially the same.

The image to be transferred onto the slab does not have to be digitally printed directly onto the slab. The image may be printed onto a decal or other intermediary when may then be applied to the slab.

In at least one embodiment an image to be printed onto the engineered stone slab is selected or created based on the characteristics of the slab produced, as opposed to producing a slab to match the image of a desired natural stone. This selection may be done by scanning or photographing the slab after production and comparing images of natural stone to the engineered stone or creating a new image either manually or using artificial intelligence (AI) in order to determine the best fit. The image is then digitally printed onto the slab.

In at least one embodiment an image of the specific engineered stone slab being processed may be scanned or photographed and compared to the image of natural stone. The image of the natural stone may then be adjusted or modified for vein placement, color, or other desired characteristics in order to form a modifying mask image. This image may be manually adjusted such as with Photoshop (trademarked) computer software. Features in this software allow for modifications such as distortions, transformations, or color adjustments while still maintaining the general appearance of the original image. Another method for modifying the image automatically is to use artificial intelligence (AI) computer software, which may be programmed to identify and make specific changes to the image in computer memory. This image processing is used to better match the image to be digitally printed onto the slab to the appearance of the finished slab using traditional methods, while making as little changes to the original image as possible in order to maintain a realistic appearance. As a result, the final product of the traditionally produced slab combined with digital printing will look more cohesive and uniform, while still maintaining a realistic appearance.

In at least one embodiment this method may be used to eliminate defects commonly found on slabs produced using traditional methods. A scan or photograph of the slab being processed may be taken to obtain a digital image. Defects that do not mechanically affect the slab but are aesthetic in nature such as color contaminants, smearing, undesired deposits and others may be identified on this image either manually or using artificial intelligence (AI), and a repair image may be generated either manually or using AI and printed onto the slab in order to mask the appearance of these defects.

In at least one embodiment a UV inhibitor may be included in the digital printing process in order to provide more UV protection to the surface of the slab.

In at least one embodiment the scan or photograph of the engineered stone slab may be replaced by a visual examination or other methods in order to identify the changes to be made to the masking image prior to printing onto the slab.

In at least one embodiment, a method is provided comprising the steps of obtaining a reference image of a natural stone; producing a first engineered stone slab which approximates an aspect of the reference image of the natural stone; performing an examination of the first engineered stone slab to obtain a first set of results; using the reference image and the first set of results to create a first masking image based on predefined criteria; and printing the first masking image onto the first engineered stone slab to form a first modified engineered stone slab.

In at least one embodiment of the present invention, the step of obtaining the reference image includes storing the reference image in a computer memory. The aspect of the reference image may be an image of a substantially two dimensional top surface of the natural stone.

The step of examining the first engineered stone slab may include photographing or scanning at least part of the first engineered stone slab.

The predefined criteria may include, for example, vein placement, vein color, vein shading, and/or visual defect elimination.

In at least one embodiment, the step of printing the first masking image onto the first engineered stone slab to form the first modified engineered stone slab includes printing the first masking image onto a decal and then transferring the decal onto the first engineered stone slab.

In at least one embodiment of the present invention, the method further includes producing a second engineered stone slab which approximates the aspect of the reference image of the natural stone, wherein the first engineered stone slab and the second engineered stone slab provide different approximations of the aspect of the reference image of the natural stone, wherein the different approximations are caused by random variation in a manufacturing process; performing an examination of the second engineered stone slab to obtain a second set of results; using the reference image and second set of results to create a second masking image based on predefined criteria; and printing the second masking image onto the second engineered stone slab to form a second modified engineered stone slab.

In yet another embodiment of the present invention, a method is provided, which includes producing a first engineered stone slab; performing an examination of the first engineered stone slab to obtain first set of results; creating or selecting a first masking image based on the results and according to predefined criteria; and printing the first masking image onto the first engineered stone slab.

The step of selecting the masking image may include selecting the masking image from a plurality of masking images stored in a computer memory.

The step of performing an examination may include photographing and/or scanning at least part of the first engineered stone slab.

The predefined criteria may include, for example, vein placement, vein color, vein shading, and/or visual defect elimination.

In at least one embodiment, the step of printing the first masking image onto the first engineered stone slab to form the first modified engineered stone slab includes printing the first masking image onto a decal and then transferring the decal onto the first engineered stone slab.

In at least one embodiment of the present invention, a method is provided which further includes producing a second engineered stone slab, which is different from the first engineered stone slab only due to random manufacturing inconsistencies; performing an examination of the second engineered stone slab to obtain a second set of results; creating or selecting a second masking image based on the second set of results and according to predefined criteria; and printing the second masking image onto the second engineered stone slab.

DETAILED DESCRIPTION OF THE DRAWINGS

Figure 1:
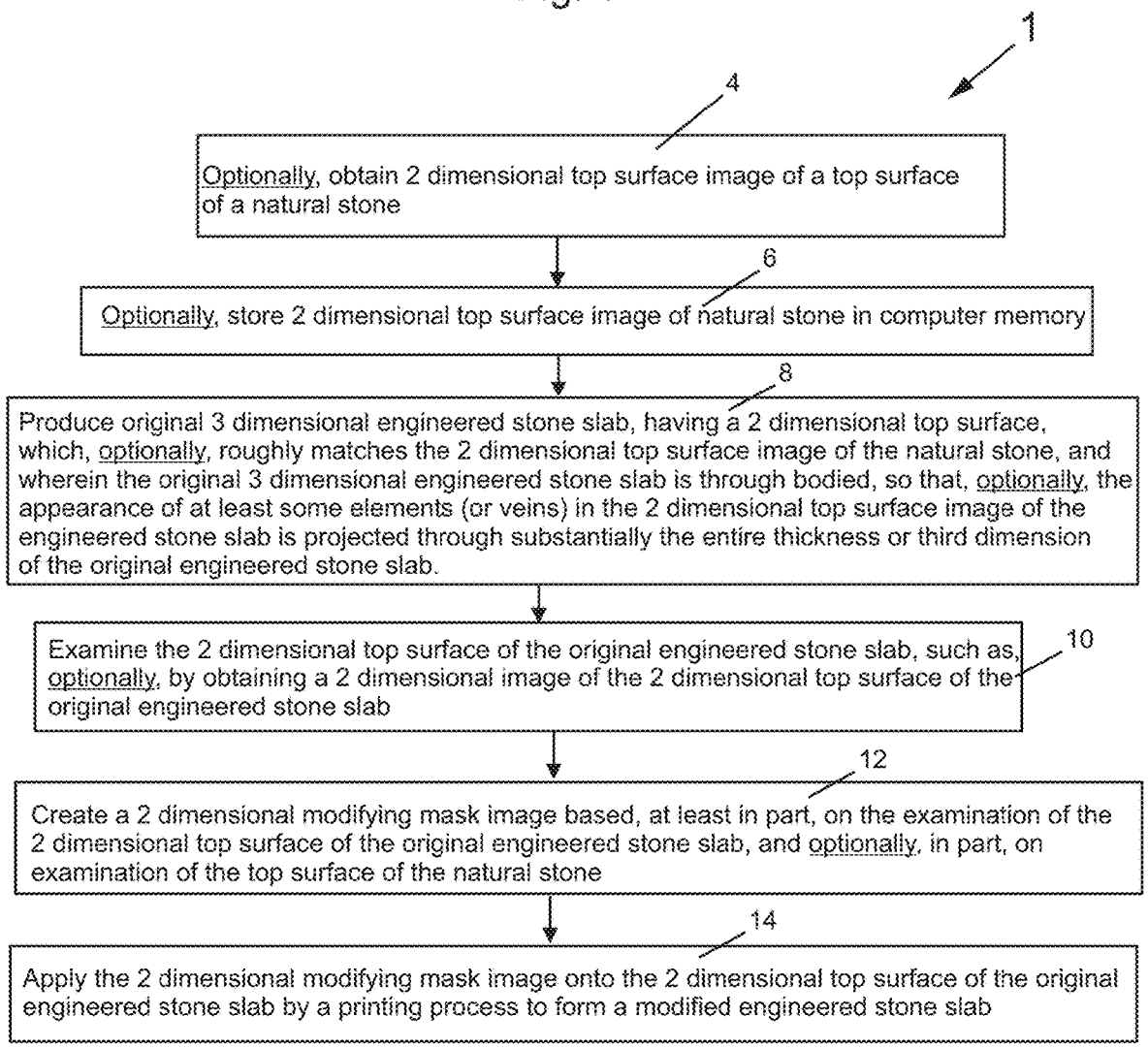
FIG. 1 shows a flow chart of a method in accordance with an embodiment of the present invention.
Figure 2:
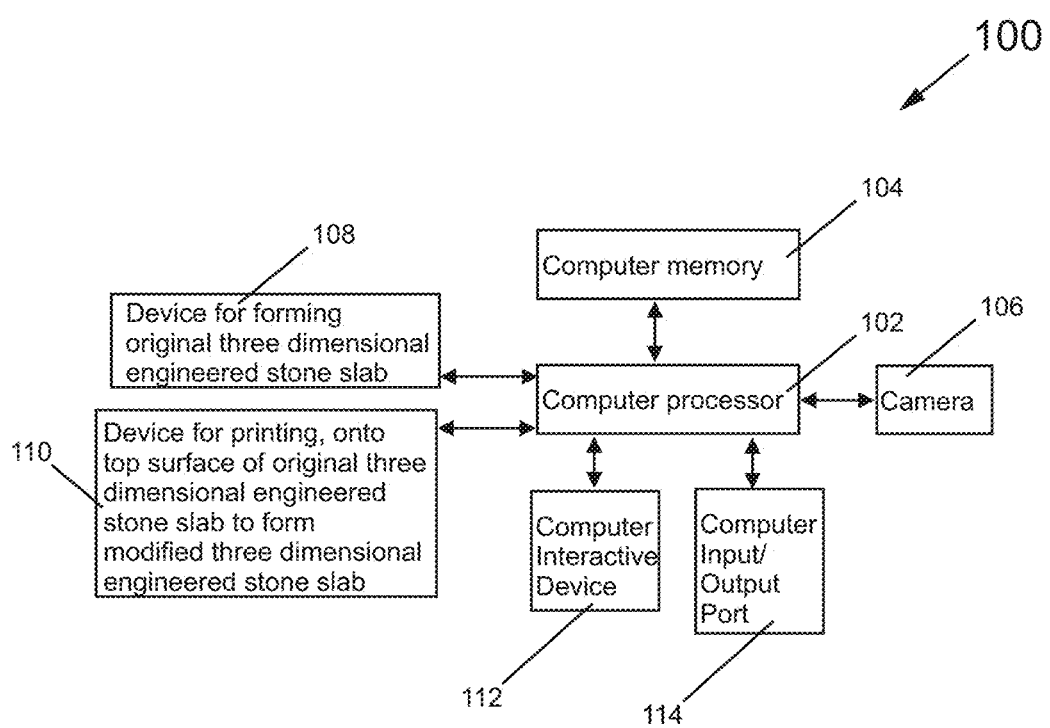
FIG. 2 shows an apparatus for use with the method of FIG. 1.

FIG. 1 shows a flow chart 1 of a method in accordance with an embodiment of the present invention. FIG. 2 shows an apparatus 100 for use with the method of FIG. 1.

The apparatus 100 includes computer processor 102, computer memory 104, camera 106, a device for forming original three dimensional engineered stone slab 108, a device for printing onto a top surface of an original three dimensional engineered stone slab to form a modified three dimensional engineered stone slab 110, a computer interactive device 112, and a computer input/output port 114. The components 104, 106, 108, 110, 112, and 114 may communicate and/or be controlled by the computer processor 102, which implements computer software stored in the computer memory 104.

The device 108 may include any combination of known devices for forming a three dimensional engineered stone slab. Such as shown in what U.S. published patent application US2021/0229313 A1, FIGS. 1-7, and page 3, col. 1, line 23 through page 3, col. 2, line 37, incorporated by reference herein.

The device 110 may include any combination of known devices for printing on a surface of a three dimensional engineered stone slab, such as shown WO2022/172242 A1 reference, where material from that reference is quoted below:

"The system 1 comprises at least one digital printing device 3 adapted to dispense at least one ink on the exposed surface S according to at least one predefined design D. The digital printing device 3 is located downstream of the hardening means 12 with respect to the direction of forward movement A and, therefore, the decoration of the slab by means of digital printing device 3 is carried out following the hardening of the compacted slab C.

The function of the digital printing device 3 is to make a decoration according to a particular predefined design D and/or to finish the decorations already present on the exposed surface S.

The digital printing device 3 comprises a plurality of print heads which are movable with respect to the exposed surface S and adapted to dispense ink according to the predefined design D." (Quoted from WO2022/172242 A1 reference, pg. 5, ln. 31-pg. 6, ln. 10).

The computer interactive device 112 of at least one embodiment, of the present invention, may include a computer keyboard, a computer mouse, and/or a computer touchscreen. The computer input/output port 114 may be configured to connect and/or communicate with the internet, and/or with another computer or computer network.

The camera 106 may be a digital camera.

Referring to FIG. 1, the method shown by flow chart 1, as implemented by computer software stored in the computer memory 104, which is executed by the computer processor 102, may include optionally, obtaining a two dimensional top surface reference image of a top surface of a natural stone at step 4.

The method may next, at step 6, as implemented by the computer processor 102, optionally include, storing the reference image of the natural stone in the computer memory 104.

Next at step 8, an original three dimensional engineered stone slab, having a two dimensional top surface, is produced, wherein the original three dimensional engineered stone slab, optionally, roughly matches the reference image of the natural stone, and wherein the original three dimensional engineered stone slab is through bodied, so that, optionally, the appearance of at least some elements (or veins) in the two dimensional top surface image of the engineered stone slab is projected through substantially the entire thickness or third dimension of the original engineered stone slab.

Figure 3:
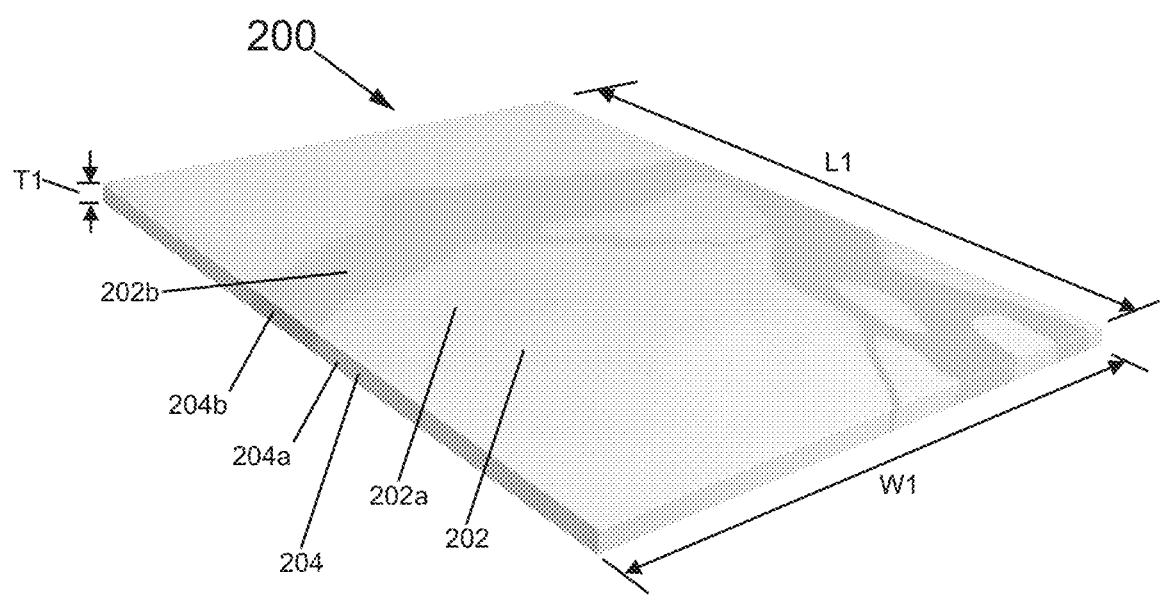
FIG. 3 shows a simplified depiction of a first generic engineered stone slab with calacatta veins.

FIG. 3 shows an example of a first original three dimensional engineered stone slab 200 which is produced after step 8. The slab 200 has a length L1, a width W1, and a depth T1. The slab 200 has a two dimensional top surface 202, including light colored region 202*a* and dark or shaded regions 202*b*. The slab 200 has a side or edge 204, which includes light colored regions 204*a* and dark colored regions 204*b*.

Referring back to FIG. 1, at step 10, the computer processor 102 and/or a human operator, examines the two dimensional top surface of the engineered stone slab, such as top surface 202 of slab 200 in FIG. 3. In at least one embodiment, it is preferred that the top surface 202 be examined by obtaining a two dimensional image of the top surface 202, such as by use of the camera 106 of apparatus 100 in FIG. 2. The two dimensional image of top surface 202 may be stored in computer memory 104 as implemented by the computer processor 102, as programmed by computer software stored in the computer memory 104.

Next, at step 12, the computer processor 102, in at least one embodiment creates a two dimensional modifying mask image based, at least in part, on the examination of the two dimensional top surface 202 of the original engineered stone slab 200, and optionally, in part, on examination of the top surface of the natural stone. The computer processor 102 may store the two dimensional modifying mask image or data concerning that, in the computer memory 104, in accordance with computer software stored in the computer memory 104.

Figure 4:
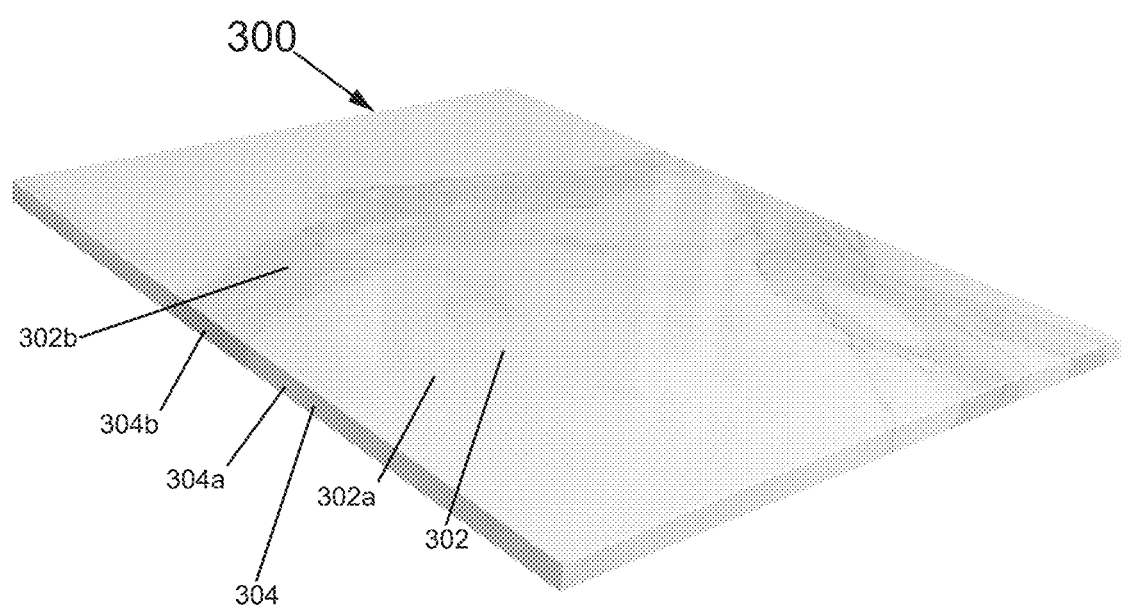
FIG. 4 shows a simplified depiction of the first original engineered stone slab after a masking image has been printed on top of all grey vein areas to form a first modified engineered stone slab.

Next, at step 14, the two dimensional masking image, in at least one embodiment is preferably applied onto the two dimensional top surface of the original engineered stone slab, such as on surface 202 of slab 200 by a printing process to form a modified engineered stone slab, such as modified slab 300 shown in FIG. 4.

In FIG. 4, the slab 300 has a top surface 302, which includes light colored area 302*a* and darker colored area 302*b*, but where the masking image has been applied onto the top surface 202 so that the area 302*b* has been modified in area compared to the area 202*b* in FIG. 3, or made more detailed in color or movement, resulting in a slab that more closely resembles natural stone.

The slab 300 of FIG. 4 includes edge 304, having light colored area 304*a* and darker colored area 304*b*, wherein, at least in this embodiment, the edge 304 is substantially the same as the edge 204 for slab 200. Generally, edge 304 will not look identical to edge 204 in that the technology that allows printing onto slabs projects the image a small distance through the thickness of the slab 300, and improvements are being made to project this distance further through the slab 300 as technology develops.

Figure 5:
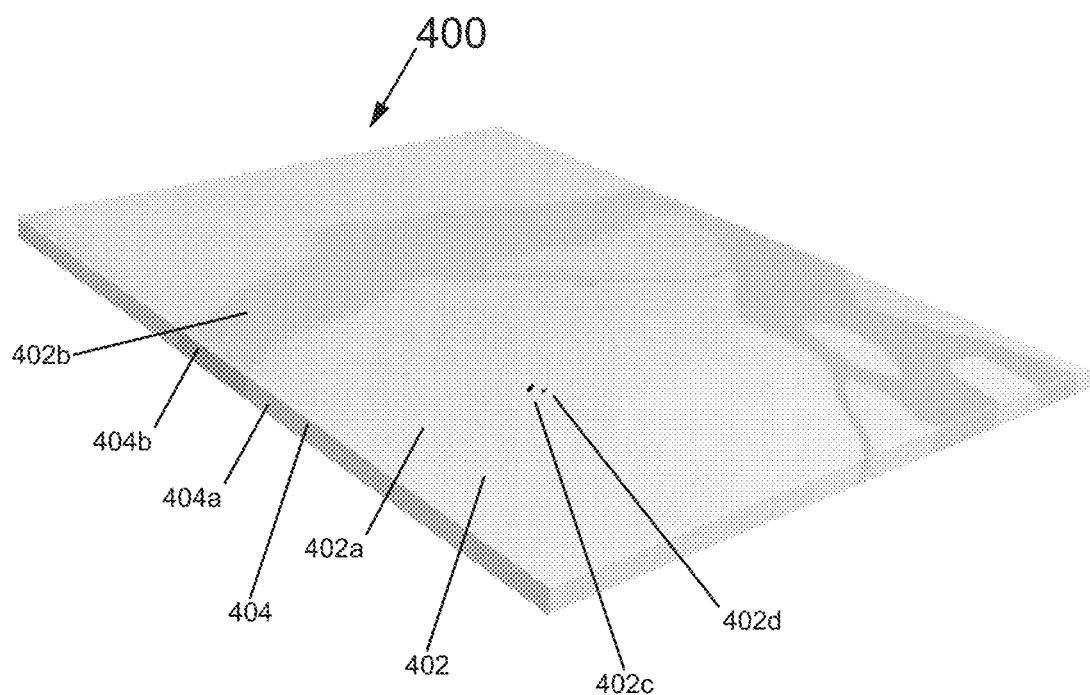
FIG. 5 shows a simplified depiction of a second original engineered stone slab which has aesthetic defects.

FIG. 5 shows a simplified depiction of a second original engineered stone slab 400 which has aesthetic defects, regions or areas 402c and 402d which are part of two dimensional top surface 402, which includes generally light colored region 402a (except for dark defects 402c and 402d which are within otherwise light colored region 402a) and darker colored region 402b (which is darker than area 402a except for defects 402c and 402d). The slab 400 also includes edge 404, which has light colored region 404a, and dark colored region 404b (which is darker than region 404a).

Figure 6:
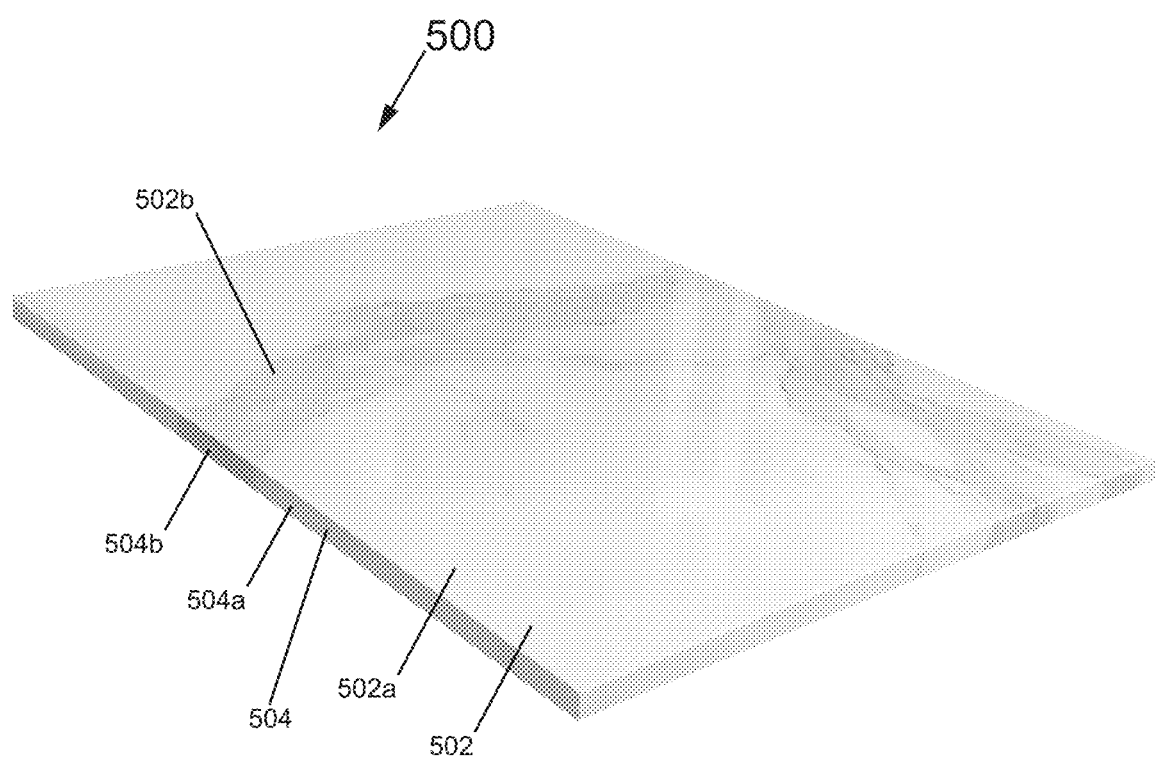
FIG. 6 shows a simplified depiction of a second modified engineered stone slab, after a masking image as been printed on the area surrounding defects 402c and 402d, completely covering the defects.

FIG. 6 shows a simplified depiction of the second original engineered stone slab after a masking image has been printed on top of the defects 402c and 402d, completely covering the defects 402c and 402 (so that modified region 502a is free of defects 402c and 402d), to form modified engineered stone slab 500. The modified engineered stone slab 500 includes top surface 502 having light colored area 502a and dark colored area 502b (which is darker than 502a). The modified engineered stone slab 500 includes edge 504 having light colored area 504a and dark colored area 504b (which is darker than area 504a), where the edge 504, and areas 504a and 504b, are typically substantially the same as and have not changed from the edge 404, and areas 404a, and 404b, respectively.

Generally, each of the slabs 200, 300, 400, and 500 may have a width W1 of approximately sixty-three inches, a length L1 of approximately one hundred and twenty-six inches and a thickness T1 (as referred to in FIG. 3) of about three centimeters, which are standard dimensions for an engineered slab, however these measurements may vary greatly.

In the example shown by FIGS. 5 and 6, a masking layer may be prepared which would may span only a six inch by six inch region of the slab 400 where the defects 402c, and 402d are located and the rest of the slab 400 in at least one embodiment, does not have anything printed on it, to form the modified slab 500.

Figure 7:
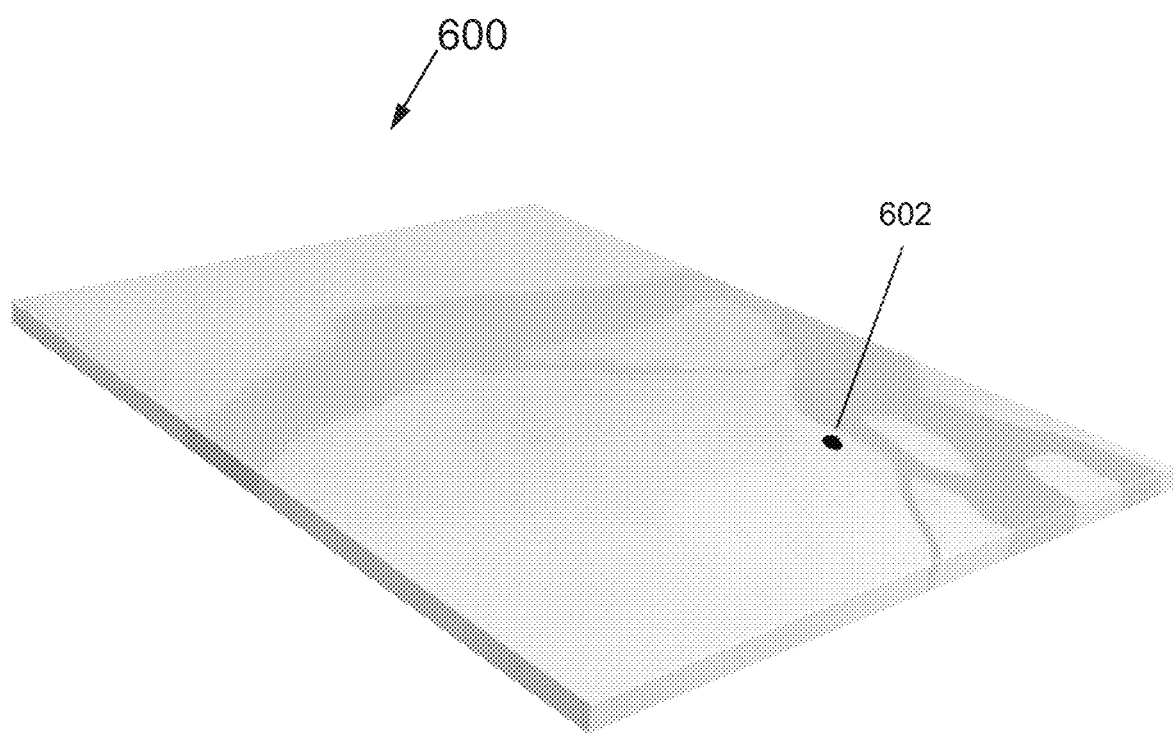
FIG. 7 shows a simplified depiction of a third original engineered stone slab, which is the same as FIG. 5, except with a different defect which is closer to a vein.
Figure 8:
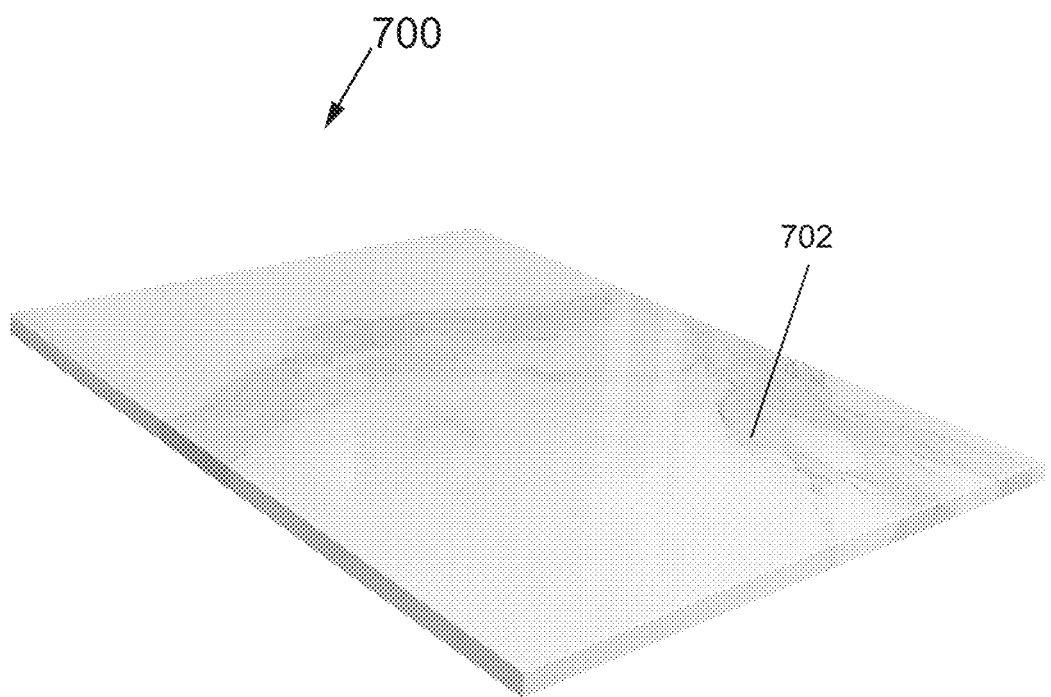
FIG. 8 shows a simplified depiction of a third modified engineered stone slab in which the masking image has been modified to adjust the vein size and placement in order to cover the defect.

FIG. 7 shows a simplified depiction of a third original engineered stone slab 600, which is the same as the engineered stone slab 200 of FIG. 3, except with slab 600 has a defect 602;

FIG. 8 shows a simplified depiction of a third modified engineered stone slab 700, having area 702 where the defect 602 has been masked by a masking image.

Figure 9:
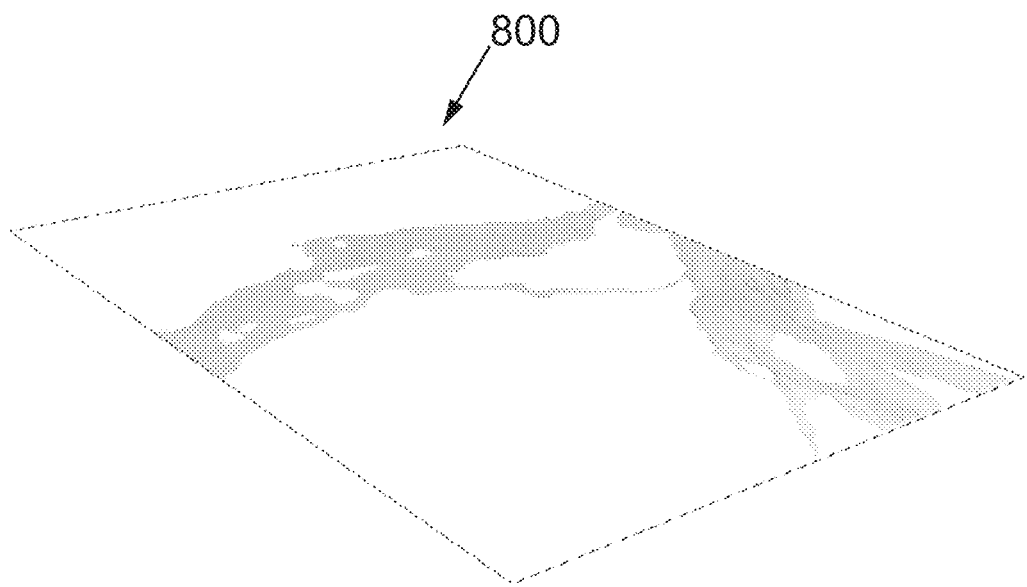
FIG. 9 shows a simplified depiction of a masking image to be printed onto the third original engineered stone slab of FIG. 7 to achieve the second modified engineered stone slab of FIG. 8.

FIG. 9 shows a simplified depiction of a masking image 800 to be printed onto the third original engineered stone slab 600 of FIG. 7 to achieve the third modified engineered stone slab 700 of FIG. 8.

Figure 10:
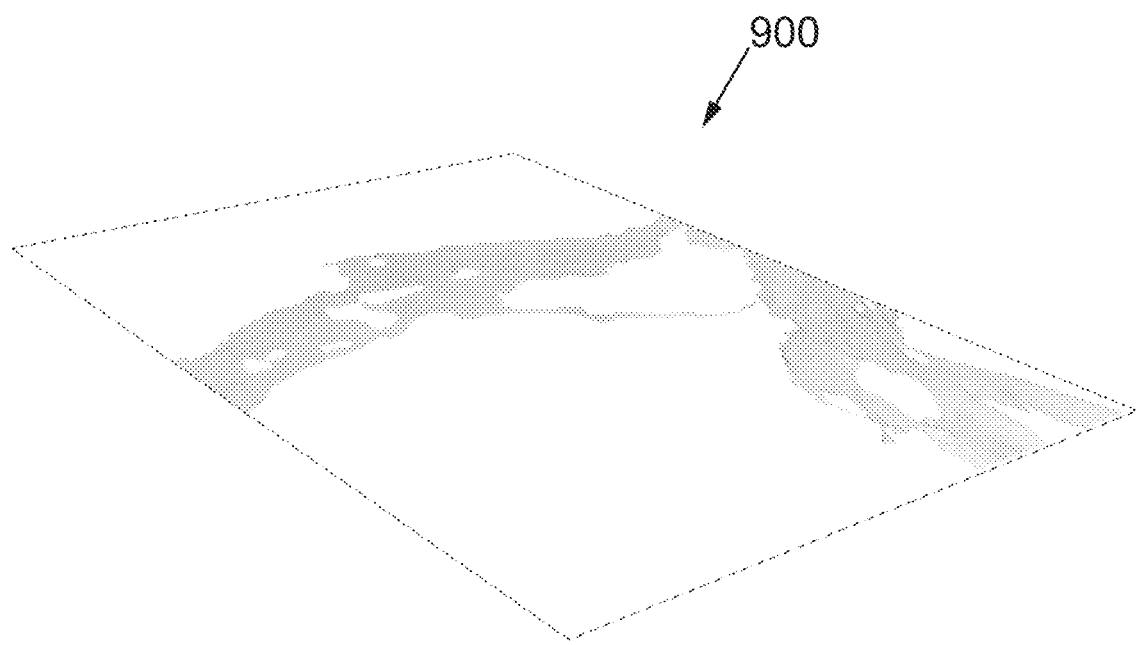
FIG. 10 shows a simplified depiction of a masking image to be printed onto the first original engineered stone slab of FIG. 3 to form the first modified engineered stone slab of FIG. 4.

FIG. 10 shows a simplified depiction of a masking image 900 to be printed onto the first original engineered stone slab 300 of FIG. 4 to form the first modified engineered stone slab 700 of FIG. 8

Figure 11:
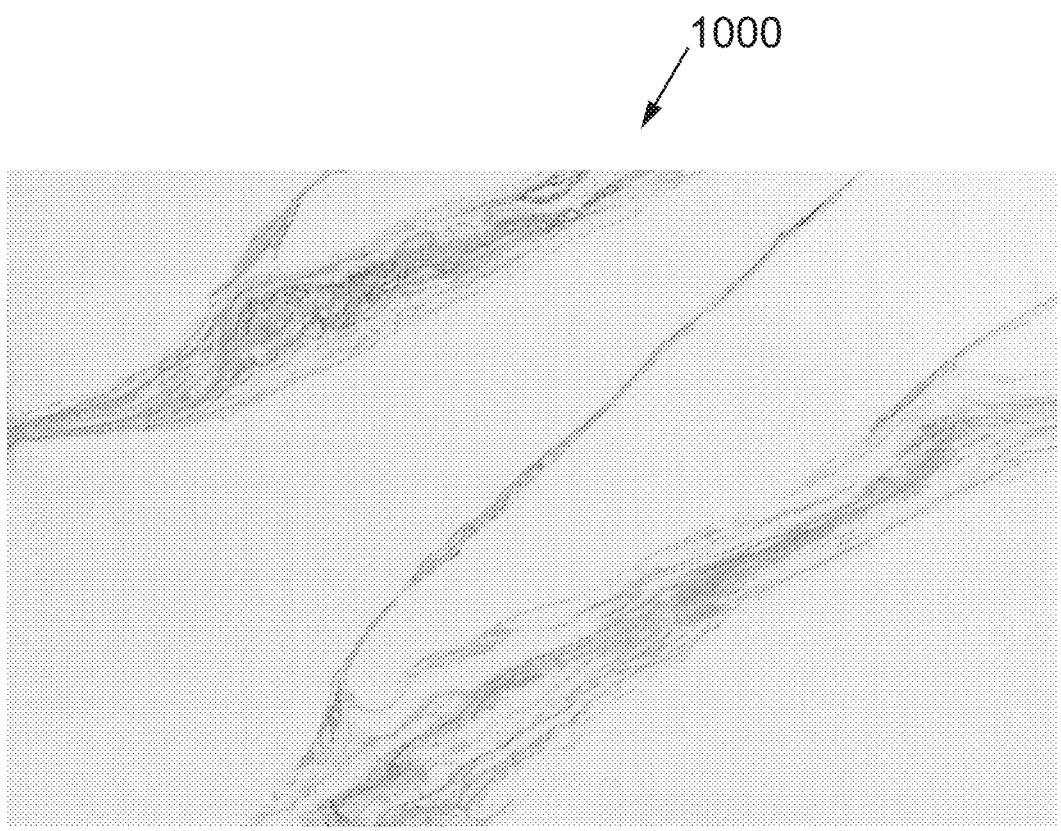
FIG. 11 shows a simplified depiction of a real natural calacatta vein.

FIG. 11 shows a simplified depiction of a real natural calacatta vein 1000.

Figure 12:
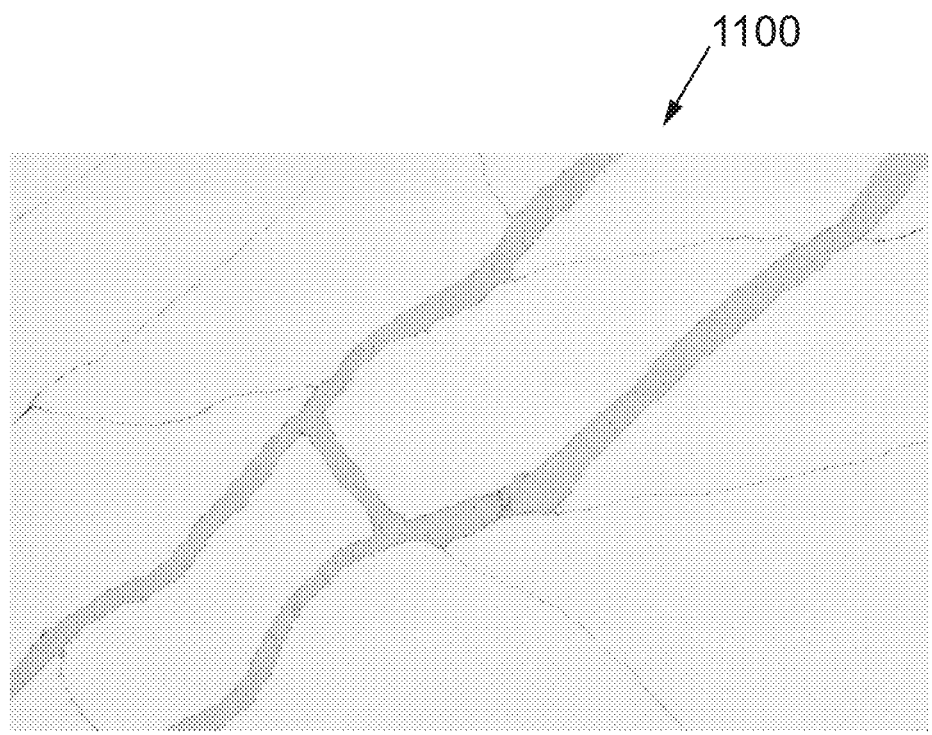
FIG. 12 shows a simplified depiction of a generic engineered stone calacatta vein.

FIG. 12 shows a simplified depiction of a generic engineered quartz calacatta vein 1100.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising the steps of:
obtaining a reference image of a natural stone, and storing the reference image in computer memory;
producing a first engineered stone slab which approximates an aspect of the reference image of the natural stone;
performing an examination of the first engineered stone slab to identify one or more veins in the first engineered stone slab;
comparing the one or more veins in the first engineered stone slab with the reference image, and adjusting the reference image in computer memory in order to create a first masking image based on predefined criteria, wherein the reference image in computer memory is adjusted so that the first masking image is better aligned in terms of at least one characteristic of the one or more veins in the first engineered stone slab with the first engineered stone slab compared to the reference image; and
printing the first masking image onto the first engineered stone slab to form a first modified engineered stone slab.

2. The method of claim 1 wherein
the at least one characteristic is color.

3. The method of claim 1 wherein
the aspect of the reference image is an image of a substantially two dimensional top surface of the natural stone.

4. The method of claim 1 wherein
the step of examining the first engineered stone slab includes photographing at least part of the first engineered stone slab.

5. The method of claim 1 wherein
the step of examining the first engineered stone slab includes scanning at least part of the first engineered stone slab.

6. The method of claim 1 wherein
the predefined criteria includes vein placement.

7. The method of claim 1 wherein
the predefined criteria includes vein color.

8. The method of claim 1 wherein
the predefined criteria includes vein shading.

9. The method of claim 1 wherein
the predefined criteria includes visual defect elimination.

10. The method of claim 1 further comprising:
producing a second engineered stone slab which approximates the aspect of the reference image of the natural stone, wherein the first engineered stone slab and the second engineered stone slab provide different approximations of the aspect of the reference image of the natural stone, wherein the different approximations are caused by random variation in a manufacturing process;
performing an examination of the second engineered stone slab to identify one or more veins in the second engineered stone slab;
comparing the one or more veins in the second engineered stone slab with the reference image, and adjusting the reference image in computer memory in order to create a second masking image based on predefined criteria, wherein the reference image in computer memory is adjusted so that the second masking image is better aligned in terms of at least one characteristic of the one or more veins in the second engineered stone slab with the second engineered stone slab compared to the reference image; and printing the second masking image onto the second engineered stone slab to form a second modified engineered stone slab.

11. The method of claim 1 wherein
the at least one characteristic is movement.

12. The method of claim 1 wherein
the at least one characteristic includes first and second characteristics;
wherein the first characteristic is color; and
wherein the second characteristic is movement.

13. The method of claim 1 wherein
the at least one characteristic of the one or more veins is placement of the one or more veins.

14. A method comprising the steps of:
obtaining a reference image of a natural stone, and storing the reference image in computer memory;
producing a first engineered stone slab which approximates an aspect of the reference image of the natural stone;
performing an examination of the first engineered stone slab to identify one or more veins in the first engineered stone;
comparing the one or more veins in the first engineered stone slab with the reference image, and adjusting the reference image in computer memory in order to create a first masking image based on predefined criteria, wherein the reference image in computer memory is adjusted so that the first masking image is better aligned in terms of at least one characteristic of the one or more veins in the first engineered stone slab with the first engineered stone slab compared to the reference image; and
printing the first masking image onto a decal and then transferring the decal onto the first engineered stone slab.

15. A method comprising
producing a first engineered stone slab;
performing an examination of the first engineered stone slab to identify one or more veins in the first engineered stone slab;
comparing the one or more veins in the first engineered stone slab with a reference image of a natural stone slab, and adjusting the reference image in computer memory in order to create a first masking image based on predefined criteria, wherein the reference image in computer memory is adjusted so that the first masking image is better aligned in terms of at least one characteristic of the one or more veins in the first engineered stone slab with the first engineered stone slab compared to the reference image;
and printing the first masking image onto the first engineered stone slab.

16. The method of claim 15 wherein
the step of performing an examination includes photographing at least part of the first engineered stone slab.

17. The method of claim 15 wherein
the step of performing an examination includes scanning at least part of the first engineered stone slab.

18. The method of claim 15 wherein
the predefined criteria includes vein placement.

19. The method of claim 15 wherein
the predefined criteria includes vein color.

20. The method of claim 15 wherein
the predefined criteria includes vein shading.

21. The method of claim 15 wherein
the predefined criteria includes defect elimination.

22. The method of claim 15 further comprising
producing a second engineered stone slab, which is different from the first engineered stone slab only due to random manufacturing inconsistencies;
performing an examination of the second engineered stone slab to identify one or more veins in the second engineered stone slab;
comparing the one or more veins in the second engineered stone slab with the reference image of a natural stone slab, and adjusting the reference image in computer memory in order to create a second masking image based on predefined criteria, wherein the reference image in computer memory is adjusted so that the second masking image is better aligned in terms of at least one characteristic of the one or more veins in the second engineered stone slab with the second engineered stone slab compared to the reference image; and
printing the second masking image onto the second engineered stone slab.

23. A method comprising the steps of:
producing a first engineered stone slab;
performing an examination of the first engineered stone slab to identify one or more veins in the first engineered stone slab;
comparing the one or more veins in the first engineered stone slab with a reference image, and adjusting the reference image in computer memory in order to create a first masking image based on predefined criteria, wherein the reference image in computer memory is adjusted so that the first masking image is better aligned in terms of at least one characteristic of the one or more veins in the first engineered stone slab with the first engineered stone slab compared to the reference image; and
printing the first masking image onto a decal and then transferring the decal onto the first engineered stone slab.

* * * * *